Jan. 29, 1924.

L. F. DOUGLASS 1,482,069

METHOD AND APPARATUS FOR PRODUCING MULTIPLE AND MINIATURE IMAGE EFFECTS IN PHOTOGRAPHY
Filed Aug. 14, 1922

Inventor:
Leon F. Douglass
By: J. F. Trabucco
Attorney

Patented Jan. 29, 1924.

1,482,069

UNITED STATES PATENT OFFICE.

LEON F. DOUGLASS, OF MENLO PARK, CALIFORNIA.

METHOD AND APPARATUS FOR PRODUCING MULTIPLE AND MINIATURE IMAGE EFFECTS IN PHOTOGRAPHY.

Application filed August 14, 1922. Serial No. 581,786.

*To all whom it may concern:*

Be it known that I, LEON F. DOUGLASS, a citizen of the United States, and a resident of Menlo Park, in the county of San Mateo and State of California, have invented new and useful Improvements in Methods and Apparatus for Producing Multiple and Miniature Image Effects in Photography, of which the following is an application.

This invention relates to a method and apparatus for producing multiple and miniature image effects on a photographic film or plate, more particularly, to a method and apparatus whereby a plurality of miniature images of a single object may be produced on a sensitized film or plate by a single exposure.

An object of my invention is to provide a novel method and improved apparatus whereby a plurality of laterally displaced and small sized images may be produced simultaneously on a single film or plate.

Another object of my invention is to provide apparatus of the type just characterized which may be readily applied to an ordinary camera without change in its mechanism or construction.

Another object of my invention is to provide a novel method and improved apparatus whereby a plurality of laterally displaced and varied size images of a single object may be produced on a single photographic film by a single exposure.

Another object of my invention is to provide apparatus of the type just characterized which may be readily applied to an ordinary camera without change in its mechanism or construction.

Generally stated I so position in front of the lens of an ordinary camera, a plurality of double concave lenses, that they are in the direct path of the light rays proceeding through the camera lens to the photographic film from the object to be photographed.

The number and size of the images produced on the photographic film will depend respectively, upon the number of double concave lenses employed and the degrees of curvature of each lens.

The invention is capable of being carried out in a variety of ways, and of receiving a variety of mechanical expressions, but it is to be expressly understood that the drawings are for purposes of illustration only and are not to be construed as a definition of the limits of the invention, reference being had to the appended claims for that purpose.

Figure 1:
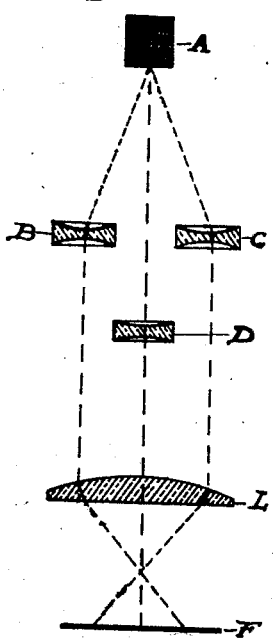
Fig. 1 is a diagrammatic view illustrating the relative arrangement of the object to be photographed, the double concave lenses, the camera lens, the photographic film, and the path of the light rays proceeding from the object to the film.
Figure 2:
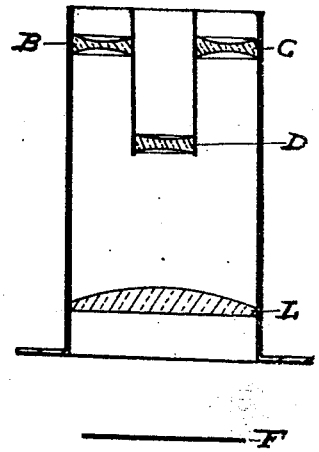
Fig. 2, is a sectional view of a camera illustrating the relative positions of the double concave lenses, the camera lens and the photographic film.
Figure 3:
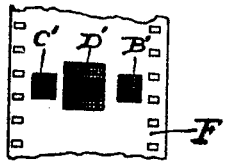
Fig. 3, is a diagrammatic fragment of a photographic film upon which appear three images, produced by means of the apparatus shown in Fig. 2.
Figure 4:
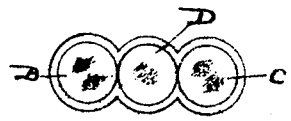
Fig. 4, is an end view of the double concave lenses used in producing a plurality of images of a single object.

Referring more particularly to Fig. 1, an object A, to be photographed, is positioned directly in front of the camera structure. Double concave lenses B, C, and D are attached to the camera structure by any suitable means such as a holding frame which is attached to the camera structure, and are positioned thereon in such a manner that D is approximately five inches immediately in front of the camera lens L, and B and C are on either side of D at a distance of approximately two and a half inches in front thereof.

B and C are —10 diopter double concave lenses, and D is a —5 diopter double concave lens. In order to produce the proper focus with reference to the object A, the camera lens L and the film F, double concave lens D is positioned at a distance of approximately five inches directly in front of camera lens L, and B and C are positioned on the left and right sides respectively of D at a distance of approximately two and one half inches in front thereof. As illustrated in Fig. 1, the light rays from object A proceed to the double concave lenses B, D and C, and are refracted through lens L to film F, where three miniature images B', D', and C' of object A are produced simultaneously. The images B' and C' are of the same size, while image D' is of comparatively larger proportions. The size of the images produced depends upon the amount of curvature of the double concave lenses employed, the more curvature causing smaller images to be produced. B and C having greater curvature than D causes images B′ and C′ to be smaller in size than image D′.

I have found that by using a larger number of concave lenses, a greater number of images can be produced, the number of images produced being the same as the number of said lenses employed. Although I have shown but three double concave lenses on the drawings, it is to be expressly understood that I am not limited to the exact number illustrated, as my invention can be successfully carried out with either a smaller or greater number.

While the embodiments of the invention illustrated on the drawings have been described with considerable particularity, it is to be expressly understood that the invention is not restricted thereto, as the same may be carried out in a variety of ways and embodied in a variety of forms, some of which will readily suggest themselves to those skilled in the art. Although I have illustrated but three double concave lenses having only two different degrees of curvature, it is evident that concave lenses of various curvatures may be used without departing from the spirit of the invention. Therefore it is to be expressly understood that I am not restricted to the forms shown in the drawings, and the term "double concave lens" is to be construed as meaning a concave lens of any curvature.

Having explained my invention, what I claim is:

1. The method of producing on a single photographic film a plurality of miniature images of a single object which comprises refracting a plurality of miniature images of said object through a lens onto said film by interposing a plurality of concave lenses in the path of the light rays from said object.

2. The method of producing a plurality of varied size miniature images of a single object upon a photographic film which comprises, refracting a plurality of varied size miniature images of said object through a camera lens onto said film by interposing a plurality of varied size double concave lenses in the path of the light rays from said object.

3. The method of producing a plurality of miniature images of a single object upon a sensitized photographic film which comprises interposing a plurality of light refracting concave lenses in the path of the light rays from said object and refracting the said light rays through the object lens of a camera by means of said concave lenses.

4. Means for producing a plurality of miniature laterally displaced images of a single object upon a sensitized photographic film which comprises, in combination with the object lens of a camera, a plurality of concave light-refracting lenses positioned in front of said camera lens with their edges laterally displaced one from the other and their axes parallel to the axis of said camera lens.

5. Means for producing a plurality of miniature images of an object upon a photographic film comprising in combination with the objective lens of a camera, a plurality of concave lenses positioned in front of said camera lens and laterally separated one from the other with their axes parallel to the axis of said camera lens.

6. In combination with the objective lens of a camera, a plurality of concave lenses laterally separated one from the other with their axes parallel to the axis of the said objective lens.

7. Means for producing a plurality of laterally displaced miniature images of an object upon a photographic film, comprising in combination with the objective lens of a camera, a plurality of concave lenses arranged side by side in front of said objective lens with their axes parallel to the axis of the objective lens of the camera.

8. In combination with a camera lens, a plurality of concave lenses of different curvatures laterally and vertically separated one from the other with their axes parallel to the axis of the camera lens.

9. In combination with a camera lens, a plurality of concave lenses adapted to refract a plurality of miniature images of a single object through said camera lens onto a film.

LEON F. DOUGLASS.